United States Patent
Hatton, Jr. et al.

[15] 3,665,055
[45] May 23, 1972

[54] POLYMERIZABLE UNSATURATED POLYESTER RESIN COMPOSITIONS AND ARTICLES MADE THEREFROM

[72] Inventors: John A. Hatton, Jr., 8030 Chaske St., Verona, Pa. 15147; John S. McNally, 457 Glenview Dr., Lower Burrell, Pa. 15068

[22] Filed: Oct. 22, 1969

[21] Appl. No.: 868,603

[52] U.S. Cl....................260/862, 117/126 GR, 161/170, 161/195, 260/40 R, 260/865
[51] Int. Cl....................C08f 43/02, C08f 43/06
[58] Field of Search....................260/862

[56] References Cited

UNITED STATES PATENTS

| | | | |
|---|---|---|---|
| 2,843,556 | 7/1958 | Moorman | 260/28.5 |
| 3,215,650 | 11/1965 | Julius et al. | 260/2.5 |
| 3,232,893 | 2/1966 | Salgado et al. | 260/2.5 |
| 3,429,946 | 2/1969 | Verdol et al. | 260/836 |
| 3,506,601 | 4/1970 | Sekmakas | 260/21 |

*Primary Examiner*—William H. Short
*Assistant Examiner*—E. A. Nielsengen
*Attorney*—Olin E. Williams, Oscar B. Brumback and Synnestvedt & Lechner

[57] ABSTRACT

Styrene-maleic anhydride copolymer is added to a polymerizable composition containing an unsaturated polyester resin and a vinyl monomeric material which is capable of reacting with the polyester resin to form a thermoset polymer. The composition can be molded into articles as it is polymerized. The articles have improved properties, including improved surface properties, due to the use of the styrene-maleic anhydride copolymer. Glass fibers, as well as other materials generally included in polymerizable polyester compositions can be used also. The composition can be used to prepare chemically thickened resin mats or prepregs which can be molded and cured into articles having improved properties, including improved surface and dimensional stability properties.

16 Claims, No Drawings

POLYMERIZABLE UNSATURATED POLYESTER RESIN COMPOSITIONS AND ARTICLES MADE THEREFROM

This invention relates to polymerizable unsaturated polyester resin compositions which can be molded and polymerized into articles having improved properties. In addition, this invention relates to polymerizable unsaturated polyester resin compositions which can be formed into thickened mats or prepregs which can be cured and molded into articles having improved properties, including improved surface properties.

The fabrication of thermoset polyester resin articles from polymerizable compositions comprising an unsaturated polyester resin dissolved in a monomeric material which is capable of polymerizing or crosslinking with said resin is well known. Examples of articles made from such compositions or formulations are: automobile parts, including fenders and hoods; pipes; boat hulls and decks; structural components, including beams; decorative fixtures; and bathroom accessories. These are but a few of the many articles which are made from polyesters. Such articles have excellent chemical and electrical properties. By combining fibrous reinforcements, such as glass fibers, with the polymerizable unsaturated polyester resin formulation (as is usually done), articles having relatively high strength and low density can be produced.

A problem that has been encountered in fabricating polyester articles is the difficulty in making or molding the articles in a manner such that the surfaces thereof are smooth and ripple-free, and do not show a pattern of the fibrous reinforcements. This is a very serious disadvantage when the article is one that has a surface that is expected to be aesthetically flawless, for example the exterior surfaces of automobile body parts. Various techniques have been utilized in efforts to produce polyester articles having smooth surfaces, but such techniques include extra processing steps which are time consuming and which add to the cost of the production process.

It has been reported relatively recently that polyester articles having smooth surface properties can be made without extra processing steps by including in the polymerizable unsaturated polyester resin formulation a thermoplastic polymer which is soluble in the monomeric crosslinking agent of the formulation. The thermoplastic polymer is said to function in a manner such that it reduces the shrinkage of the polymerizable formulation as it cures, and in some cases, it causes the formulation to expand as it cures. It is well known that conventional formulations can shrink as much as 10 percent by volume as they polymerize. The rough surface properties of polyester articles have been attributed at least in part to this shrinking characteristic.

A few examples of the thermoplastic polymeric materials which have been reported to reduce the shrinkage of the formulation or effect its expansion as it cures include: homopolymers of styrene, lower alkyl methacrylates and acrylates; copolymers of methyl methacrylate and low alkyl esters of acrylic acid or methacrylic acid; and copolymers of methyl methacrylate and styrene, methacrylic acid, methacrylic amide or methylol acrylic amide. Polymerizable unsaturated polyester resin formulations containing such thermoplastic polymers have been termed "low profile" polyester formulations.

Whatever the advantages realized by the use of "anti-shrink" materials of the type described above, it has been found nonetheless that they have various undesirable characteristics. For example, it has now come to light that articles cannot be made satisfactorily from polymerizable polyester formulations which contain the aforementioned type of anti-shrink thermoplastic polymers and which formulations are in a thickened form due to the presence of a chemical thickening agent. By way of background, it is noted that it is known to add materials to polymerizable liquid polyester resin formulations which effect chemical thickening thereof. Speaking generally, resin formulations containing a chemical thickening agent can be combined with fibrous reinforcements and formed into pre-thickened resin mats (also called prepregs) which can be cured and molded into articles. Examples of materials which effect the chemical thickening of polymerizable liquid polyester resin formulations include magnesium oxide, and a mixture of calcium oxide and calcium hydroxide or magnesium oxide. (Such thickening materials are to be distinguished from fillers which are often incorporated into resin formulations and increase its viscosity.) The use of such curable prethickened resin mats to mold polyester articles has a number of advantages over the many other fabrication techniques for preparing such articles. The mats can be handled very conveniently, material waste is relatively small in amount, improved surface properties can be attained, and intricately shaped articles can be made relatively quickly and conveniently.

As briefly mentioned above, the presence of the aforementioned types of anti-shrink thermoplastic polymers in chemically thickened polyester resin mats has been found to be unsatisfactory. More specifically, it has been found that articles made from such mats have surfaces which are mottled. This detracts greatly from their appearance. Furthermore, it has been found that when such mats are molded under heat and pressure, substantial deposits in the nature of a film of the thermoplastic polymer are left on the surfaces of the mold. If such deposits are allowed to accumulate, they can have an adverse effect on the surface properties of subsequently molded articles. Cleaning the mold surface of the deposits is, of course, a time consuming job. It appears that such deposits are caused by the exudation of the anti-shrink thermoplastic polymer to the surface of the mat. (It is noted that the above problems are not encountered when the thickened resin mat contains no thermoplastic polymer.) Examination of a chemically thickened polyester resin formulation containing an anti-shrink thermoplastic polymer shows that said polymer appears to separate from the formulation and exist therein in the form of globules dispersed throughout the formulation. It is impractical, if not impossible, to mix the globules back into the formulation because of its thickened state.

From the above, it will be appreciated that the use of the aforementioned type of anti-shrink thermoplastic polymers in thickened mats gives rise to problems in formulating the mats and in the process of curing and molding the mats and that the surfaces of articles made therefrom have an unattractive appearance. Thus, it is a shortcoming of such polymeric materials that they cannot be used satisfactorily in fabricating articles from thickened mats because, as mentioned above, this fabrication method has a number of advantages over other fabrication methods.

The above discussion has been directed to only some of the undesirable characteristics of the aforementioned types of anti-shrink thermoplastic polymers mentioned above. In the overall picture, there are other problems which are encountered in their use. And the other problems can exist when the resin formulation in which they are used is in a chemically thickened form or in an unthickened form. For example, and as previously noted, some low profile formulations tend to expand when they cure. This has an adverse effect on mold release and can cause a wedging of the casting or article within the mold. Another problem that has been encountered is that when pigments are dispersed in heretofore known low profile resin formulations, the surfaces of articles made therefrom do not have a uniform color and the color is not as deep as would be expected or desired. For example, the color of an article made from a formulation containing a black pigment can turn out to be a light grey of varying shades. This, of course, is aesthetically unappealing.

In view of the above, it is an object of this invention to provide polymerizable unsaturated polyester resin formulations which can be cured to produce articles of improved properties, including improved surface properties.

It is an additional object of this invention to provide polymerizable unsaturated polyester resin formulations which can be formed into thickened mats which can be molded into articles having improved properties, including improved surface properties.

In accordance with this invention, it has been found that the addition of a styrene-maleic anhydride copolymer to a polymerizable formulation comprising an unsaturated polyester resin dissolved in a monomeric component which can crosslink with said resin to form a thermoset polymer produces a composition which can be polymerized to form articles having improved properties, including improved surface properties.

The numerous and important advantages which are realized by the use of styrene-maleic anhydride copolymer (a thermoplastic polymer) in polyester resin formulations according to this invention are indeed surprising and unexpected. Thus, the use of a copolymer of styrene and maleic anhydride which contains as little as 2 wt. percent maleic anhydride (and thus as much as 98 wt. percent styrene) provides striking improvements and advantages over the use of a homopolymer of styrene or other thermoplastic polymers which have been proposed heretofore for preparing low profile polyester resin formulations. Examples reported hereinafter are illustrative of this.

Generally speaking, compositions within the scope of this invention comprise:

| Ingredients | Approximate Amounts | |
| --- | --- | --- |
| | (% by weight based on total weight of ingredients (a), (b) and (c)) | |
| | Broad Range | Preferred Range |
| a. an unsaturated polyester resin capable of crosslinking with a vinyl monomer to form a thermoset polymer; | 10–75 | 25–65 |
| b. a vinyl monomer capable of crosslinking with said polyester resin of (a) above to form said thermoset polymer; and | 20–70 | 30–60 |
| c. a styrene-maleic anhydride copolymer. | 3–50 | 5–20 |

The preferred method of fabricating articles having improved properties, including improved surface properties, according to this invention is by curing and molding in a matched-metal mold chemically thickened polyester resin mats or prepregs containing styrene-maleic anhydride copolymer. Generally speaking, such mats or prepregs can comprise:

| Ingredients | Approximate Amounts | |
| --- | --- | --- |
| | (% by weight based on total weight of composition) | |
| | Broad Range | Preferred Range |
| a. a resin and monomer portion comprising about: i. 10–75 wt. % and preferably 25–65 wt. % of an unsaturated polyester resin capable of crosslinking with a vinyl monomer to form a thermoset polymer; ii. 20–70 wt. % and preferably 30–60 wt. % of a vinyl monomer capable of crosslinking with said polyester resin of (i) above form said thermoset polymer; and iii. 3–50 wt. % and preferably 5–20 wt. % of a styrene-maleic anhydride copolymer; | 15–95 | 20–60 |
| b. a chemical thickening agent; | 0.25–10 | 0.5–5 |
| c. fibrous reinforcements; and | 5–70 | 10–40 |
| d. filler | 0–70 | 20–60 |

As will be discussed more fully below other ingredients which are usually added to polymerizable polyester formulations can be added to the compositions of this invention, including the thickened mats or prepregs described immediately above. In addition, compositions within the scope of this invention can be fabricated into articles by methods other than the preferred method mentioned above and examples of such methods are discussed more fully below.

The advantages provided by this invention are numerous. Articles having extremely smooth surfaces can be made from the compositions of this invention. Pigmented compositions can be fabricated into articles whose surfaces have a deeper and more uniform color than those prepared from the above described low profile polyester resin formulations. When fabricating articles from thickened mats comprised of the compositions of this invention, surfaces which are not mottled can be obtained. Furthermore, thickened mats made from the compositions of this invention do not create problems by leaving deposits on the surfaces of the mold in which they are formed and cured into articles.

In addition, it has been found that articles made from chemically thickened mats or prepregs which contain a styrene-maleic anhydride copolymer have better dimensional stability properties than articles made from heretofore known chemically thickened mats. Large sized articles or small sized and thin articles made from heretofore known mats tend to warp or bow. For example, the warping or bowing of a panel can be so severe that it cannot be used. In cases where the dimensional instability is less severe, problems can be encountered in installing articles such as panels. It is difficult, if not impossible to form smooth joints. It is not unusual to use fillers in an attempt to produce a smooth joint. Aside from such functional problems, the warpage or bowing of such articles is quite unattractive. Various steps have been taken in attempts to overcome such dimensional instability problems, but they are time consuming and add to the overall cost of preparing and installing the articles. The use of styrene-maleic anhydride copolymer in the chemically thickened mats included within the scope of this invention has the advantage that such stability problems can be mitigated or avoided.

There follows a detailed description of the invention.

Unsaturated polyester resins that can be utilized in the composition of this invention are those formed by condensing an alpha, beta-ethylenically unsaturated dicarboxylic acid or anhydride thereof with a dihydric alcohol. A saturated dicarboxylic acid or anhydride thereof may be included also in this type of esterification polymerization. The unsaturated polyester resins produced by such reactions are known, of course, as are processes for preparing them.

Examples of ethylenically unsaturated dicarboxylic acids and anhydrides that can be used to prepare the unsaturated polyester resins are maleic anhydride, fumaric acid, chloromaleic acid, itaconic acid, citraconic acid, and mesaconic acid.

Examples of dihydric alcohols that can be used to prepare the unsaturated polyester resins are ethylene glycol, propylene glycol, butylene glycol, diethylene glycol, dipropylene glycol, triethylene glycol and isopropylidene bis- (p-phenyleneoxypropanol-2), cyclohexanedimethanol, neopentyl glycol and cyclobutanediol.

Examples of saturated dicarboxylic acids and anhydrides that can be used in preparing the unsaturated polyester resins are phthalic anhydride, isophthalic acid, tetrahydrophthalic anhydride, succinic acid, glutaric acid, adipic acid, pimelic acid, suberic acid, azelaic acid and sebacic acid.

In addition, unsaturated polyester resins that can be used in this invention can be ones which contain alcohols having more than two hydroxyl groups or acids, either saturated or unsaturated, containing more than two carboxyl groups. Examples of such ingredients are glycerol, pentaerythritol, trimellitic acid and pyromellitic acid.

The acid number and the molecular weight of the unsaturated polyester resin can vary over a wide range, for example from about 10 to about 100 and from about 750 to about 5,000 respectively. Preferably, the acid number should be less than about 35 and the molecular weight within the range of about 1,000 to about 3,000.

The reactivity of the unsaturated polyester resin should be within the range of about 20 to about 100 mol percent of the total acid component of the resin and preferably within the range of about 50 to about 100.

The particular unsaturated polyester resin used in the formulation should be selected on the basis of the desired properties of the articles that are being made. In producing articles where the surface properties are extremely important and where good overall strength is desired, it is preferred to use resins that are prepared by condensing maleic anhydride and propylene glycol or by condensing propylene glycol, dipropylene glycol, maleic anhydride and isophthalic acid.

The amount of unsaturated polyester resin comprising the formulation may vary over a wide range, for example from about 10 to about 75 wt. percent and preferably, from about 25 to about 65 wt. percent based on the weight of said resin, the vinyl monomeric crosslinking agent and the styrene-maleic anhydride copolymer.

A vinyl monomeric material which is capable of crosslinking with the unsaturated polyester resin is present also in the formulation. The crosslinking agent should be one in which the styrene-maleic anhydride copolymer is soluble. Examples of crosslinking agents, which contain alpha, betaethylenic unsaturation, are styrene, vinyl toluene, diallyl phthalate, alphamethyl styrene and methylmethacrylate. Mixtures of crosslinking agents can be used. It is preferred to utilize styrene as the crosslinking agent.

The amount of crosslinking agent comprising the polymerizable formulation can vary over a wide range, for example, from about 20 to about 70 wt. percent based on the weight of the polyester resin, said crosslinking agent and the styrene-maleic anhydride copolymer. Preferably, the crosslinking agent comprises from about 30 to about 60 weight percent of the aforementioned three ingredients.

Turning now to the styrene-maleic anhydride copolymer which in accordance with the invention has been found to function in a manner such that the numerous and important advantages heretofore discussed are attained, it is noted that this thermoplastic polymer is one which is known and is commercially available. The copolymer can vary in molecular weight over a wide range and in the proportions of styrene and maleic anhydride which comprise it. For use in this invention, the styrene-maleic anhydride copolymer should be one which is soluble in the particular vinyl monomeric crosslinking agent that is used in the formulation.

Speaking generally, a styrene-maleic anhydride copolymer can be prepared by reacting maleic anhydride with styrene at elevated temperatures, preferably in the presence of a peroxide catalyst. (See, for example, the following U. S. Pats.: No. 2,866,771; No. 2,971,939 and No. 2,989,517.) The molar or weight ratio of styrene to maleic anhydride present in the polymer can vary over a wide range. (It is noted that the molecular weights of styrene (104) and maleic anhydride (98) are very close to each other so that the molar ratio of one to the other is approximately the same as their weight ratios.) For example, the copolymer can be prepared to contain approximately equal weight (molar) proportions of styrene and maleic anhydride or a major weight (molar) proportion of styrene.

It is preferred to utilize a styrene-maleic anhydride copolymer wherein the maleic anhydride comprises about 2 wt. percent to about 15 wt. percent of the copolymer. However, it should be understood that the copolymer can contain somewhat lower amounts of the maleic anhydride or higher amounts thereof. Furthermore, it should be understood that when the term "styrene-maleic anhydride copolymer" is used herein and in the claims, it includes within its meaning copolymers that contain substituents on the benzene ring or the alkenyl portions of the styrene, and also polymers which contain in the polymeric chain small amounts of other materials such as, for example, alpha-methyl styrene. Examples of the aforementioned substituents are chloro and lower alkyl groups. Polymers containing such groups can be prepared, for example, by reacting chloro-styrene or vinyl toluene with maleic anhydride. Polymers containing amounts of other materials in the polymer chain can be prepared, for example, by reacting styrene, maleic anhydride and the unsaturated dimer of alpha-methyl styrene.

The molecular weight of the styrene-maleic anhydride copolymer may vary over a wide range, for example, from about 2,000 to about 300,000. Preferably, it should have a molecular weight within the range of about 800,000 to about 200,000.

Specific examples of styrene-maleic anhydride copolymers that can be used in practicing this invention are as follows: a copolymer containing about 75 wt. percent styrene and about 25 wt. percent maleic anhydride and having a molecular weight of about 2,000; a copolymer containing about 90 wt. percent styrene and about 10 wt. percent maleic anhydride and having a molecular weight of about 80,000; a copolymer containing about 92 wt. percent styrene and about 8 wt. percent maleic anhydride and having a molecular weight of about 98,000; and a copolymer containing about 98 wt. percent styrene and about 2 wt. percent maleic anhydride and having a molecular weight of about 125,000. These are but a few of the examples of styrene-maleic anhydride copolymers that can be used. It should be understood that other copolymers of different molecular weight, different proportions of styrene and maleic anhydride, and those containing other ingredients in the polymeric chain can be used provided that the polymer is soluble in the crosslinking agent. Mixtures of different styrene-maleic anhydride copolymers may be used also in the compositions within the scope of this invention.

The unsaturated polyester resin and the styrene-maleic anhydride copolymer should be soluble in the monomeric crosslinking agent. When these three ingredients are mixed and allowed to stand, there is a tendency for two liquid layers to form, one of which appears to comprise the unsaturated polyester dissolved in the crosslinking agent and the other of which appears to comprise the styrene-maleic anhydride copolymer dissolved in said agent. These two layers can be mixed together and they should be mixed prior to molding and curing the formulation into the desired articles. As will be described more fully below, the formation of such layers is not encountered when a chemical thickening agent is present in the formulation.

As mentioned above, articles having excellent properties, including surface properties, can be made in a trouble-free manner from chemically thickened mats or prepregs comprising the compositions of this invention. Any of the available chemical thickening agents which are effective in thickening unsaturated polyester resin formulations can be used and the thickened mats can be formed by any of the available techniques. Examples of chemical thickening agents which can be added to the polymerizable formulation are magnesium oxide and a mixture of magnesium oxide and aliphatic monocarboxylic acid (or anhydride thereof). Such thickening agents are described in U. S. Pat. Nos. 2,628,209 and 3,390,205. A preferred thickening agent consists of a mixture of calcium oxide and either magnesium oxide or calcium hydroxide as described in U. S. Pat. No. 3,431,320. It should be understood that these are but a few of the thickening agents that can be used and that others can be used also. Furthermore, it should be understood that the thickening of the polymerizable polyester resin formulation is not effected by the commencement of vinyl copolymerization between the unsaturated polyester resin and the crosslinking agents nor is it effected by the addition of fillers to the formulation which have a tendency to increase its viscosity. The amount of chemical thickening agent added to the polymerizable formulation should be, of course, sufficient to effect the desired degree of thickening and this will depend to an extent on the other components comprising the composition. Speaking generally, and by way of example, the thickening agent may comprise from about 0.25 to about 10 wt. percent and preferably from about 0.5 to about 5 wt. percent of the composition based on the total weight of the composition. After adding the chemical thickening agent to the composition, thickened mats or prepregs can be formed according to any of the available techniques. It is noted that the chemical thickening agent will cause the viscosity of the composition to increase over a period of time. The mat or prepreg should be allowed to increase in viscosity to the extent that when the mat is molded and cured there will be substantially uniform flow of the resin and the fibrous reinforcement portions of the composition.

After a thickening agent is mixed into the formulation, there is no tendency for separate layers of unsaturated polyester resin and styrene-maleic anhydride copolymer to form. It appears that the thickening agent inhibits the formulation of such layers. Furthermore, unlike thickened formulations containing heretofore known thermoplastic polymeric anti-shrink materials, there is little or no tendency for the styrene-maleic anhydride copolymer to form into globules in the thickened formulations of this invention.

Other materials which are generally incorporated into polymerizable unsaturated polyester resin formulations to obtain special effects may also be used in the compositions included within the scope of this invention. Thus, fillers, initiators or catalysts, crosslinking and stabilizing inhibitors, accelerators or promoters, pigments and mold release additives, etc. can also be incorporated in the composition. In addition, fibrous reinforcements, preferably glass fibers, can be added to the formulations or impregnated therewith according to available techniques to increase or upgrade the physical properties, particularly the strength, of the articles produced.

Examples of fillers that can be used are calcium carbonate, clays and calcium silicate. The presence of fillers appears to aid in maintaining the styrene-maleic anhydride copolymer in thickened formulations and to inhibit its separation, particularly when the thickened formulation is stored for extended periods of time. For this reason, it is preferred that the thickened formulations contain fillers in amounts ranging up to about 70 wt. percent and preferably in an amount within the range of about 20 to about 60 wt. percent based on the total weight of the composition.

Examples of initiators or catalysts that can be used are t-butyl perbenzoate, t-butyl hydroperoxide, succinic acid peroxide and cumene hydroperoxide.

Examples of crosslinking and stabilizing inhibitors that can be used are hydroquinone and t-butyl catechol.

Examples of accelerators or promoters which can be used are cobalt naphthenate, diethyl aniline and dimethyl aniline.

Examples of pigments that can be utilized are iron oxides, titanium dioxide and phthalocyanins.

Glass fiber reinforcements in any of their available forms can be used, including for example, mats of chopped or continuous strands of glass, glass fabrics, chopped glass rovings and chopped glass strands. It should be understood that other fibrous reinforcements can be used also such as, for example, asbestos and synthetic fibers such as acrylonitrile fibers and linear polyester fibers.

The amount of fibrous reinforcements used in the composition can vary over a wide range, for example, from about 5 to about 70 wt. percent based on the total weight of the composition. Preferably, the amount of fibrous reinforcements should be within the range of about 10 10 to about 40 wt. percent based on the total weight of the composition.

The polymerizable unsaturated polyester resin formulations included within the scope of this invention can be polymerized and cured into articles according to any of the available techniques. For example, vacuum and pressure bag techniques can be used, or the articles can be made in a matched-metal mold utilizing premix or wet lay-up techniques. In addition, articles can be made by the pultrusion technique.

As mentioned above, excellent surface properties can be obtained by curing and molding chemically thickened mats in a matched-metal mold. The pressure and temperature of the mold, as well as molding time, will depend on the particular components comprising the composition and on other factors, for example the catalyst used and on the size and thickness of the mat. For best results, these variables should be selected on the basis of experience. In general, however, pressures within the range of about 50 psi to about 3,000 psi, temperatures in the range of about 180° to about 330° F. and a molding time of about 30 seconds to about 30 minutes can be used.

Examples which follow are illustrative of the practice of this invention. Included in the examples are the molding and curing of articles from chemically thickened mats comprising compositions of this invention and also from compositions which do not contain a thickening agent. Properties of various articles made according to the invention are set forth also.

The compositions of Examples 1 – 4 in Table 1 below are illustrative of compositions within the scope of this invention. The compositions of Examples 5 – 7 are set forth for comparative purposes. Each of the compositions set forth in the table comprised: (a) 40 parts by wt. of an unsaturated polyester resin having a molecular wt. of about 1,500 and formed by condensing one mole of propylene glycol with one mole of maleic anhydride; (b) 45 parts by wt. of styrene monomer crosslinking agent; (c) 15 parts by wt. of the thermoplastic polymer identified in the table; and (d) a thickening agent consisting of a mixture of 1.0 wt. percent calcium oxide and 1.5 wt. percent calcium hydroxide based on the total wt. of the composition. Each of the compositions was prepared by mixing the polyester resin, the styrene, and the thermoplastic polymer and thereafter adding the thickening agent to the resulting mixture. Each of the resulting compositions was allowed to thicken and after about 4 hours each was examined to determine whether there was separation of the thermoplastic polymer. The results of the examinations are set forth in Table 1.

TABLE I

| Example number | Thermoplastic polymer in polyester composition | Thermoplastic polymer of thickened polyester composition |
|---|---|---|
| 1 | Styrene-maleic anhydride copolymer containing about 75 weight percent styrene and about 25 weight percent maleic anhydride and having a molecular weight of about 2,000. | No separation. |
| 2 | Styrene-maleic anhydride copolymer containing about 90 weight percent styrene and about 10 weight percent maleic anhydride and having a molecular weight of about 80,000. | Do. |
| 3 | Styrene-maleic anhydride copolymer containing about 92 weight percent sytrene and about 8 weight percent maleic anhydride and having a molecular weight of about 98,000. | Do. |
| 4 | Styrene-maleic anhydride copolymer containing about 98 weight percent styrene and about 2 weight percent maleic anhydride and having a molecular weight of about 125,000. | Do. |
| 5 | Polystyrene having a molecular weight of about 6,000. | Separation. |
| 6 | Polymethylmethacrylate. | Do. |
| 7 | Styrene-acrylonitrile copolymer containing 85 weight percent styrene and 15 weight percent acrylonitrile and having a molecular weight of about 120,000. | Do. |

As is reported in Table I, the styrene-maleic anhydride copolymers present in the thickened compositions of Examples 1 – 4 did not separate from them. These thickened compositions had to the naked eye the appearance of homogeneous pastes. On the other hand, the thermoplastic polymers present in the thickened compositions of Examples 5 – 7 did separate therefrom. (It is noted that such thermoplastic polymers have been reported heretofore as being suitable anti-shrink agents for use in low profile polymerizable polyester resin formulations.) The compositions of Examples 5 – 7 contained what appeared to be globules of the thermoplastic polymers which were dispersed throughout the compositions and which were evident to the naked eye. When such compositions are cured and molded, the problems described previously are encountered. On the other hand, as will be seen from the data presented hereinbelow, such problems are not encountered with compositions within the scope of this invention.

In another group of examples, compositions corresponding to those of Examples 1 – 4 above were prepared. However, prior to adding the thickening agent to the compositions, 30 parts by wt. of calcium carbonate filler were added to 45 parts of each of the compositions; in addition, there was added to each of the compositions 1 by weight (based on the weight of the polyester resin and styrene) of 2,5 dimethyl-2,5-bis (benzoylperoxy) hexane (Luperox 118) catalyst and 1 by wt. (based on the weight of the polyester resin, styrene and styrene-maleic anhydride copolymer) of a mixture of salts of mono- and di- alkyl phosphate (Zelec NE) mold release additive. To each of the thickenable compositions, there was added 25 parts by weight of chopped glass rovings (about 1 inch in length) and thickened mats were formed from them according to a conventional technique. The thickened mats were cured and molded into boxes in a matched-metal mold at a temperature of about 275° F. and a pressure of about 1,500 psi for about 3 minutes. (The boxes that were made in this group of examples, as well as those prepared in examples which follow, were 11 inches wide, 14 inches long and 3 inches deep, with the side walls of the boxes being disposed at an oblique angle to the base of the box. The walls of the boxes were about one-eighth inch thick.) No deposits of the styrene-maleic anhydride copolymers were present on the mold surfaces at the end of the molding process. There was no problem of mold release nor was the box wedged in the mold. The boxes had excellent surface smoothness, good mechanical strength and good dimensional stability. The surfaces of the boxes were not mottled.

The next three examples show the preparation of thickenable polyester resin formulations within the scope of this invention, the preparation of thickened mats from the formulations, and the curing and molding of the mats into boxes. The examples also illustrate that the thickened mats can be stored for relatively long periods of time and then cured and molded satisfactorily. The excellent surface and mechanical strength properties of boxes made from the mats are reported in Table II which follows the examples.

Example 6

A thickenable liquid polyester resin formulation was prepared by mixing (a) 40 parts by wt. of an unsaturated polyester resin (formed by condensing one mole of propylene glycol with one mole of maleic anhydride to give a molecular weight of about 1,500), (b) 45 parts by wt. of styrene, and (c) 15 parts by wt. of styrene-maleic anhydride copolymer containing about 90 wt. percent styrene and about 10 wt. percent maleic anhydride and having a molecular weight of about 80,000. The formulation also contained 1 percent by weight (based on the total weight of ingredients (a) and (b) above) of 2,5,dimethyl-2,5-bis (benzoylperoxy) hexane (Luperox 118) catalyst and 1 percent by weight (based on the total weight of ingredients (a), (b) and (c) above) of a mixture of salts of mono- and di- alkyl phosphate (Zelec NE) mold release additive. To 45 parts by weight of this formulation there was added 30 parts by wt. of calcium carbonate filler and a thickening agent consisting of a mixture of 1 percent calcium oxide and 1.5 percent calcium hydroxide based on the total weight of ingredients (a), (b) and (c) above. To the thickenable formulation there was added 25 parts by wt. of one inch lengths of chopped glass fiber rovings and the resulting formulation was formed into thickened mats according to a conventional technique. The thickened mats were stored for various periods of time after which they were cured and molded into boxes in a matched-metal mold. The mats were stored for 1 day, 2 day, and 1, 2, 3 and 4 week periods prior to molding. The molding was done at a temperature of 275° F. and a pressure of 1,500 pounds per square inch and for a 3 minute period. With respect to those mats that were molded after periods of storage of 1 week and less, it was observed that no styrene-maleic anhydride copolymer deposits were left on the mold surfaces. With respect to those mats that were molded after periods of storage of 2 weeks and longer, it was observed that very small and insignificant amounts of styrene-maleic anhydride copolymer deposits were left on the mold surfaces. The smoothness and other physical properties of those boxes made from the mats stored for the 1 day and 2 week periods were measured. They are reported in Table II below. All of the boxes had very smooth surfaces which were not mottled.

Example 7

A thickenable liquid polyester resin formulation corresponding in all respects to the formulation set forth in Example 6 above, except for the use of 10 parts by wt. of styrene-maleic anhydride copolymer (instead of 15 parts by wt.), was prepared. The formulation was formed into thickened mats which were stored for various periods of time and then cured and molded into boxes as described in Example 6. All of the boxes had very smooth surfaces which were not mottled. See Table II below for the properties of the boxes made from the mats stored for the 1 day and 2 week periods.

Example 8

A thickenable polyester resin formulation corresponding in all respects to the formulation set forth in Example 6 above, except for the use of a styrene-maleic anhydride copolymer containing about 98 wt. percent styrene and about 2 wt. percent maleic anhydride, was prepared. The formulation was formed into thickened mats which were stored for various periods of time and then cured and molded into boxes as described in Example 6. All of the boxes had very smooth surfaces which were not mottled. See Table II below for the properties of the boxes made from the mats stored for the 1 day and 2 week periods.

TABLE II.—PHYSICAL PROPERTIES OF BOXES

| Thickened mats from which boxes were molded | Surface-profile or smoothness in MK[1] | ASTM D-638 | | ASTM D-790 | | | | | ASTM D-695, Comp. strength, p.s.i. | ASTM D-256, impact strength, ft.-lbs./in. (notched) |
|---|---|---|---|---|---|---|---|---|---|---|
| | | Tensile strength, p.s.i. | Tensile modulus, p.s.i. | Flexural strength, room temp., p.s.i. | Flexural modulus, room temp., p.s.i. | Flexural strength, 176° F., p.s.i. | Flexural modulus, 176° F., p.s.i. | Comp. modulus, p.s.i. | | |
| Composition of Example 6, mat stored one day | 70 | 15,200 | 2,377,600 | 32,200 | 1,467,300 | 13,400 | 1,080,900 | 1,161,000 | 22,700 | 14.2 |
| Composition of Example 6, mat stored two weeks | 70 | 13,900 | 1,966,000 | 26,500 | 1,433,300 | 24,900 | 1,173,400 | 1,055,200 | 23,300 | 14.5 |
| Composition of Example 7, mat stored one day | 70 | 12,500 | 2,077,200 | 22,800 | 1,323,000 | 18,900 | 931,000 | 1,031,500 | 26,300 | 13.4 |
| Composition of Example 7, mat stored two weeks | 70 | 10,300 | 1,760,800 | 28,500 | 1,583,300 | 20,000 | 992,800 | 877,900 | 22,700 | 11.4 |
| Composition of Example 8, mat stored one day | 70 | 16,500 | 2,609,500 | 28,400 | 1,500,000 | 21,400 | 1,054,500 | 1,153,700 | 21,400 | 12.6 |
| Composition of Example 8, mat stored two weeks | 70 | 14,200 | 2,150,500 | 30,400 | 1,760,800 | 26,100 | 1,105,500 | 1,051,200 | 24,200 | 12.9 |

[1] The surface-profile or smoothness is measured by a microcorder device (Bendix Corp. Micrometrical Div.) in all of the examples presented herein. Abbreviation "MK" means microinches.

The examples which follow are illustrative of compositions within the scope of this invention which do not contain a thickening agent and which were molded and cured into articles according to conventional wet lay-up or premix techniques.

Example 9

This example is illustrative of the production of a laminate or flat sheet made from a composition within the scope of this invention by the wet lay-up technique. The following polymerizable composition was prepared:

| Ingredients | Parts by Weight |
| --- | --- |
| a. an unsaturated polyester resin having a molecular wt. of about 1,200 and formed by condensing three moles of propylene glycol, two moles of maleic anhydride and one mole of phthalic anhydride. | 24 |
| b. styrene | 27 |
| c. styrene-maleic anhydride copolymer containing about 90 wt. % styrene and about 10 wt. % maleic anhydride and having a molecular weight of about 80,000. | 9 |
| d. kaolin clay filler-av. particle size of 4.8 microns (ASP 400 of Minerals and Chemicals Philipp Corporation). | 40 |

The above composition contained also 1 percent of benzoyl peroxide catalyst and 0.5 percent of a mold release additive, a mono- and di- alkyl phosphate, (Zelec UN), the amount of each based on the total weight of ingredients (a), (b), and (c) above. The liquid composition was poured onto a glass fiber reinforcement made up of a core of 4 plies of 1.5 ounce continuous glass strand mat (Owens-Corning M8621) sandwiched between two outer layers each made up of two plies of glass veil (Owens-Corning M514 TRT 236. The glass fiber reinforcement impregnated with the polymerizable composition was placed in a mold and cured therein for 2 minutes at 250° F. and a pressure of 250 pounds per square inch. The smoothness of the surface of the laminate that was obtained was measured and found to have a value of 310 microinches. When laminates were prepared from compositions which did not contain the styrene-maleic anhydride copolymer, it was found that the smoothness of their surfaces had values within the range of 640–770 microinches. Thus, their surfaces were more than twice as rough as the surface of the laminate prepared from the composition of Example 9.

Example 10

This example is illustrative of the production of a box made from a composition within the scope of this invention by the premix technique. The following polymerizable composition was prepared:

| Ingredients | Parts by Weight |
| --- | --- |
| a. an unsaturated polyester resin having a molecular weight of about 1200 and formed by condensing three moles of propylene glycol, two moles of maleic anhydride and one mole of phthalic anhydride. | 14 |
| b. styrene | 15.75 |
| c. styrene-maleic anhydride copolymer containing about 90 wt. % styrene and about 10 wt. % maleic anhydride and having a molecular weight of about 80,000. | 5.25 |
| d. kaolin clay filler-av. particle size of 4.8 microns (ASP 400 of Minerals and Chemicals Philipp Corporation.) | 40 |

The above composition contained also 0.5 percent tertiary butyl perbenzoate catalyst and 0.5 percent of a mold release additive, a mono- and di- alkyl phosphate (Zelec UN), the amount of each based on the total weight of ingredients (a), (b) and (c) above. The aforementioned ingredients were mixed and then placed into a heavy-duty mixer (Baker-Perkins which was run at a slow speed as 25 parts by weight of chopped glass rovings having lengths of about one-fourth inch were added to the composition in the mixer. The resulting composition was then cured and molded into a box in a matched-metal mold at a temperature of 300° F., a pressure of 1,000 pounds per square inch and for 3 minutes. The smoothness of the surface of the box was measured and found to have a value of 180 microinches. On the other hand, a box made from a premix that did not contain the styrene-maleic anhydride copolymer had a value of 340 microinches. Thus, it had a surface that was almost twice as rough as the surface of the box made from the composition of Example 10.

Various other properties of the box made from the composition of Example 10 were measured also. The properties measured and the values obtained are set forth below.

ASTM D–2583–67 Test
   Barcol hardness — 50–52
ASTM D–790
   room temp. flex. strength — 12,800
   200° C. flex. strength — 6,300
   room temp. flex. modulus — 1,574,800
   200° C. flex. modulus — 718,000

It can thus be seen that the box had excellent strength properties.

In another group of examples, polyester-dispersed pigments were added to compositions within the scope of this invention to impart to articles made therefrom different colors, namely black, green, gray, blue and orange. For the purpose of direct comparison, the same pigments were used in heretofore known low profile polyester resin compositions. Laminates were made from each of the compositions. The surfaces of each of the laminates made from the heretofore known low profile formulations had a non-uniform color, that is the color varied in shade; and the depth of the color was rather poor. By comparison, surfaces of each of the laminates made from the pigmented compositions within the scope of this invention had a much more uniform and a deeper color.

In summary, it can be said that the use of a styrene-maleic anhydride copolymer in polymerizable polyester compositions as disclosed herein provides a number of advantages, including both functional and aesthetic advantages. As to functional advantages, the composition within the scope of this invention can be molded into articles without encountering problems inherent in molding heretofore known compositions. From the standpoint of aesthetic advantages, compositions within the scope of this invention can be utilized to produce articles which have surfaces which are very smooth and articles which have surfaces of improved color uniformity and depth.

We claim:

1. A polymerizable composition comprising in the unreacted state:
   a. about 10 to about 75 wt. percent of an ethylenically unsaturated polyester resin prepared by reacting an ethylenically unsaturated dicarboxylic acid or anhydride thereof with a diol and capable of crosslinking with a vinyl monomer to form a thermoset polymer;
   b. about 20 to about 70 wt. percent of a vinyl monomer capable of crosslinking with said polyester resin to form said thermoset polymer; and
   c. about 3 to about 50 wt. percent of a thermoplastic styrene-maleic anhydride copolymer.

2. A composition according to claim 1 wherein said styrene-maleic anhydride copolymer comprises at least about 50 wt. percent styrene and wherein the molecular weight of said copolymer is within the range of about 2,000 to about 300,000.

3. A composition according to claim 2 wherein the molecular weight of said styrene-maleic anhydride copolymer is within the range of about 80,000 to about 200,000.

4. A composition according to claim 1 wherein said styrene-maleic anhydride copolymer comprises about 2 to about 15 wt. percent maleic anhydride.

5. A polymerizable composition comprising in the unreacted state:
   a. about 25 to about 65 wt. percent of an ethylenically unsaturated polyester resin prepared by reacting an ethylenically unsaturated dicarboxylic acid or anhydride thereof with a diol and capable of crosslinking with a vinyl monomer to form a thermoset polymer;
   b. about 30 to about 60 wt. percent of a vinyl monomer capable of crosslinking with said polyester resin to form said thermoset polymer; and
   c. about 5 to about 20 wt. percent of a thermoplastic styrene-maleic anhydride copolymer.

6. A composition according to claim 5 wherein said styrene-maleic anhydride copolymer comprises at least about 50 wt. percent styrene and wherein the molecular weight of said copolymer is within the range of about 2,000 to about 300,000.

7. A composition according to claim 6 wherein the molecular weight of said styrene-maleic anhydride copolymer is within the range of about 80,000 to about 200,000.

8. A composition according to claim 5 wherein said styrene-maleic anhydride copolymer comprises about 2 to about 15 wt. percent maleic anhydride.

9. A polymerizable composition comprising in the unreacted state:
   a. an ethylenically unsaturated polyester resin prepared by reacting an ethylenically unsaturated dicarboxylic acid or anhydride thereof with a diol and capable of crosslinking with a vinyl monomer to form a thermoset polymer;
   b. a vinyl monomer capable of crosslinking with said polyester resin to form said thermoset polymer; and
   c. a thermoplastic styrene-maleic anhydride copolymer.

10. A polymerizable composition comprising, in the unreacted state:
    a. about 25 to about 65 wt. percent of an unsaturated polyester resin prepared by reacting maleic anhydride and propylene glycol;
    b. about 30 to about 60 wt. percent of styrene; and
    c. about 5 to about 20 wt. percent of thermoplastic styrene-maleic anhydride copolymer having a molecular weight within the range of about 80,000 to about 200,000 and a maleic anhydride content of about 2 to about 15 wt. percent.

11. A composition according to claim 1 wherein said polyester resin and said styrene-maleic anhydride copolymer are each soluble in said vinyl monomer.

12. A composition according to claim 5 wherein said polyester resin and said styrene-maleic anhydride copolymer are each soluble in said vinyl monomer.

13. A composition according to claim 9 wherein said polyester resin and said styrene-maleic anhydride copolymer are each soluble in said vinyl monomer.

14. In the process for preparing thermoset polyester articles wherein a polymerizable composition comprising:
    a. an ethylenically unsaturated polyester prepared by reacting an ethylenically unsaturated dicarboxylic acid or anhydride thereof with a diol;
    b. a vinyl monomer capable of crosslinking with said polyester to form said thermoset article; and
    c. a thermoplastic polymer;

is cured and molded into said article, and wherein said thermoplastic polymer improves the smoothness of the surface of said article, the improvement comprising incorporating into said polymerizable composition, while in the unreacted state, thermoplastic styrene-maleic anhydride copolymer in an amount sufficient to improve the smoothness of the surface of said article, and thereafter molding and curing said polymerizable composition into said article.

15. A process according to claim 14 wherein said styrene-maleic anhydride copolymer comprises at least about 50 wt. percent styrene, wherein the molecular weight of said copolymer is within the range of about 2,000 to about 300,000, wherein the amount of said copolymer in said polymerizable composition is about 3 to about 50 wt. percent and wherein said copolymer and said polyester are each soluble in said vinyl monomer.

16. A process according to claim 15 wherein the amount of maleic anhydride in said styrene-maleic anhydride copolymer is about 2 to about 15 wt. percent, wherein the molecular weight of said copolymer is within the range of about 80,000 to about 200,000 and wherein the amount of said copolymer in said polymerizable composition is about 5 to about 20 wt. percent.

* * * * *

UNITED STATES PATENT OFFICE
CERTIFICATE OF CORRECTION

Patent No. 3,665,055             Dated May 23, 1972

Inventor(s) John A. Hatton, Jr. and John S. McNally

It is certified that error appears in the above-identified patent and that said Letters Patent are hereby corrected as shown below:

Column 3, line 68, after "above", read --to--.

Column 6, line 14, read --80,000-- instead of "800,000".

Column 7, line 69, omit "10", first occurrence.

Column 9, line 13, after "1", read --%--.

Column 11, line 33, after "236", read --)--.

Column 12, line 3, after "kins", read --)--.

Signed and sealed this 10th day of October 1972.

(SEAL)
Attest:

EDWARD M. FLETCHER, JR.
Attesting Officer

ROBERT GOTTSCHALK
Commissioner of Patents